INVENTORS
GEORGE R. MARKOW
AND ANTHONY J. HORNFECK
BY
Raymond W. Jenkins
ATTORNEY United States Patent Office 2,730,304
Patented Jan. 10, 1956

2,730,304

FAIL-SAFE CONTROL SYSTEM

George Robert Markow, Cleveland Heights, and Anthony J. Hornfeck, Lyndhurst, Ohio, assignors to Bailey Meter Company, a corporation of Delaware Application September 2, 1950, Serial No. 183,071

4 Claims. (Cl. 236—78)

Our invention relates to electrical networks sensitive to a variable, arranged to indicate departure from a predetermined range of the variable and may be adapted to maintain the value of the variable within the range.

We have arranged electronic means in an electrical circuit whose control by a variable establishes the energy level in the circuit. Additional electronic means have been utilized to establish a predetermined maximum value of the energy level while additional provision has been made for establishing a minimum value of energy level. Another way of regarding the functions of the components we have with novelty combined is to consider the condition of failure at various points in our network; whether the failure is of a nature to abnormally raise or lower the circuit energy level, a positive indication is provided in what is commonly referred to as a fail-safe operation.

We have, therefore, as an object, the provision of means to detect the value of a variable and indicate, record and/or control its departure from a predetermined range of values.

Another object is to provide an electrical network in which component failure would be positively indicated.

Still another object is the provision of means to detect the presence of a condition and to positively indicate its absence.

Figure 1:
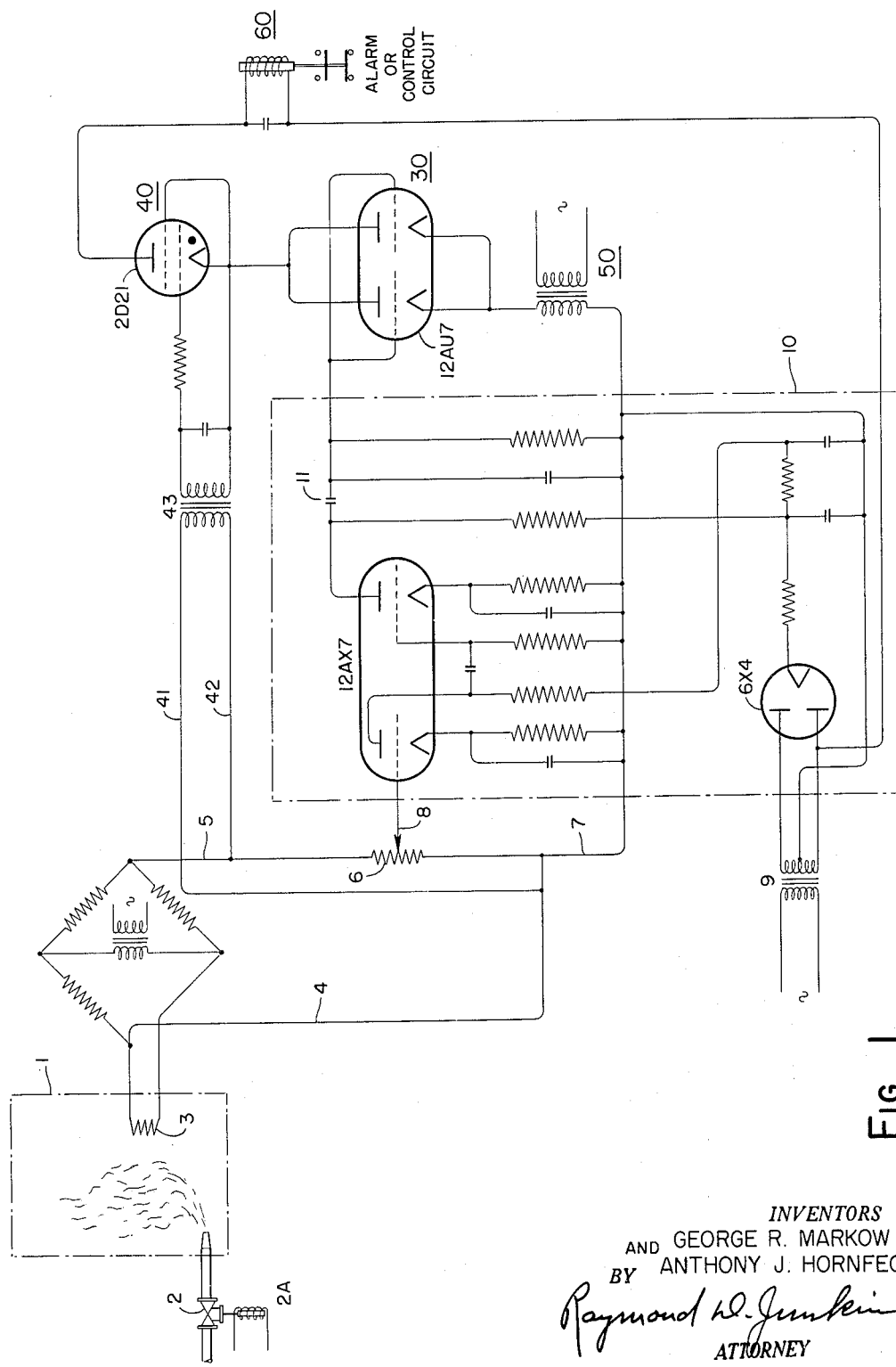
Fig. 1 is an electrical network sensitive to a variable utilizing our invention to indicate departure from a predetermined range of values.

Referring to Fig. 1, an embodiment of our invention may be seen performing a necessary and useful function in an electrical network which operates an electro-mechanical relay to give a signal when a variable temperature reaches either of two predetermined values or controls a fuel valve supplying the combustion adjusting the temperature. A heated space is diagrammatically depicted at 1, supplied its heat by combustion at burner 2 controlled in its fuel supply by solenoid-operated valve 2A operating preferably to a maximum or to a minimum opening condition. Having as an object, the detection of temperature in this heated space 1, we show a resistance element 3 sensitive to the space heat and incorporated in a conventional Wheatstone bridge supplied from an alternating current source and with output going to leads 4, 5. Resistance 6 is placed across leads 4 and 5 and the output voltage of the bridge will appear across it, preparatory to amplification.

We have provided a conventional tube amplifier 10 for control of an output tube 30 whose circuit includes an electro-mechanical relay device which in turn may operate audible or visual signal networks or valve 2A. The amplified signal through 10 is intended to cause the plate current through output tube 30 and its external circuit to vary in accordance with the magnitude of the amplified signal. A tube 40 is included in the external circuit of output tube 30 to function as a maximum limiting device which may be designed to deenergize the circuit in which it is included upon the amplified signal from the Wheatstone bridge reaching a predetermined maximum value.

A transformer 50 is also included in the external circuit of tube 30 and may be utilized to deenergize the circuit after the purpose of tube 40, but when the amplified signal from the Wheatstone bridge reaches a predetermined minimum value. Thus it may be seen in perspective that we have provided a novel electrical network whereby departure from a predetermined range of temperature, between predetermined maximum and minimum values, within a heated space may be visually or audibly expressed in the operation of an electro-mechanical relay included in the circuit of our network which may also control the agent affecting the temperature.

Returning specially to the locale of the tube amplifier 10 it may be readily seen that the input of this particular electrical network is by means of leads 7 and 8 across resistance 6, lead 8 being adjustable across resistance 6 for convenient range adjustment. An alternating current source 9 is depicted as applied to a 6X4 rectifier tube providing a source of direct current. The historic development and theory of operation of this type of amplifying network may be traced through at least the Ryder Patents 2,275,317 and 2,333,393 as well as the Hornfeck Patent 2,437,603.

Briefly, the tube amplifier 10 is a phase sensitive amplifier for control of such a device as tube 30 represents, here specifically a 12AU7 tube. A double triode resistance coupled tube specifically of the 12AX7 type is provided in the amplifier 10 network to provide a two stage amplification for the signal ultimately controlling output tube 30.

The circuits associated with the 12AX7 tube include the source of direct current from the 6X4 rectifying tube and certain resistances and capacitors. The grids of the 12AX7 tube may be biased so that it is not conducting, or is conducting a predetermined amount. While the rectifier 6X4 tube supplies current to the plates of the 12AX7 tube, it has no effect upon the potential impressed upon the grids of the output tube 30, by virtue of a condenser 11. Upon passage of alternating current from the output of the Wheatstone bridge, however, a current appears in the output of the 12AX7 which is alternating in character and which will pass through the condenser 11 and render the output tube 30 more or less conductive in accordance with the magnitude of the amplified Wheatstone bridge output. In emphasis, the alternating component of the voltage across the plate resistance of the 12AX7 amplifier tube is impressed upon the grids of the 12AU7 output tube 30 through the condenser 11. It will, therefore, be solely the amplified component of the voltage across the output circuit of the 12AX7 tube, produced by the voltage from the Wheatstone bridge, which will be effective for controlling the grid-cathode potential relationship of the 12AU7 tube 30.

Heating of resistance element 3 will unbalance the Wheatstone bridge whose output voltage will be in phase with the anode voltage of the 12AU7 output tube 30 after amplification by 10. Consequently, plate current will flow through tube 30 and through its external circuit including electro-mechanical relay 60. This current will be substantially proportional to the degree of heat to which resistance 3 is subjected and, if sufficient, may be arranged to energize the relay and maintain a closed contact. If the sensed heat drops below a certain intensity, the signal output of the bridge will drop to a correspondingly low value and a predetermined minimum value may be determined at which the electro-mechanical relay is deenergized.

If the temperature to which element 3 is sensitive exceeds a predetermined maximum value, our circuit is provided with a 2D21 type of tube 40 for deenergizing the electro-mechanical relay 60. Through leads 41, 42 the output voltage of the Wheatstone bridge is stepped up by means of transformer 43 and applied to the grid of the tube 40 in such a way that when it is in phase with the plate voltage of the output tube 30, it is out of phase with the anode voltage of tube 40 and consequently will stop the latter from conducting current, at a value of transformer 43 output determined by its ratio and the characteristics of tube 40. With tube 40 arranged in series with tube 30, it will deenergize the electro-mechanical relay 60 as effectively as it was deenergized when the predetermined minimum temperature was reached. Upon operation within the range established between maximum and minimum values, the output of the bridge is not sufficient to turn off tube 40 which tube also has a very low resistance which does not affect the operation of the 12AU7 output tube 30 within the so-called normal range of operation.

Aside from the heretofore outlined function of our circuit, its partially inherent fail-safe feature may readily be seen, and with the inclusion of transformer 50, the fail-safe provisions impressively complete.

An open or short circuit in any of the elements of the bridge including resistance element 3 will produce a signal voltage either in phase or out of phase with the supply voltage. If the voltage is out of phase, as for example produced by a short circuit of resistance element 3, output tube 30 will be turned off resulting in deenergization of the electro-mechanical relay 60. If the failure is of the type such as open circuit of the resistance element 3 or short circuit of its adjacent bridge element, the output signal of the bridge will be very large and in phase with the anode voltage of tube 30. Without the inclusion of such a tube as 40, this voltage would make output tube 30 conducting and energize the electro-mechanical relay 60. However, with the function of tube 40 as heretofore explained, when such a failure occurs and the signal reaches the predetermined magnitude for which the circuit was designed, tube 40 is turned off and consequently the electro-mechanical relay 60 is deenergized after the fashion of the action obtained when the sensed heat goes out of the predetermined range. This is the inherent fail-safe feature of this embodiment of our invention.

Ordinarily failure of the 12AX7 tube of amplifier 10 or any of the components of amplifier 10 such as the 6X4 rectifier tube will result in zero grid voltage on the output tube 30 regardless of the condition of operation of the Wheatstone bridge. If the output tube 30 were not biased, it would conduct current under this condition and prevent electro-mechanical relay 60 from dropping out to indicate mal-function. However, transformer 50 provides an alternating current bias voltage applied to the grid circuit and the voltage obtained from this transformer biases the grid in a negative direction with respect to the cathode, or is out of phase with the plate voltage, and consequently prevents the tube from conducting current when the grid voltage obtained from the amplifier 10 approaches zero. Thus we are provided a fail-safe feature at either end of the working range of this embodiment of our invention. Finally, it can be seen, of course, that if either the tube 40 or the tube 30 fails due to loss of ignition or from some other cause, it becomes non-conductive, consequently resulting in a deenergization of the electro-mechanical relay 60. It is also obvious that a failure to the power supply transformer 9 will cause deenergization of the electro-mechanical relay 60.

In Fig. 1 the relay 60 is shown in its deenergized position. Under this condition the closed contacts may energize a signal light or alarm as a warning of temperature (or other variable) exceeding, in an increase or decrease direction, the band of temperature considered as normal. When temperature is within the "normal" band the relay 60 is energized.

The end of lead 8 forms a contact selectively movable over the resistance 6 to provide a "range adjustment." The system is preferably a narrow range device in which the operating range will span an alarm or control value and the operating range can be moved along by manually moving 8 over 6.

As mentioned, the transformer 50 provides a bias to the end that relay 60 is also deenergized when temperature falls below the predetermined minimum. Now, if relay 60 were to also actuate the solenoid valve 2A, it will be apparent that with the valve at a normal opening position when relay 60 is energized, we would want high temperature to cause the relay 60 to be deenergized and trip valve 2A to a predetermined low opening position, but we would not want a low temperature deenergization of relay 60 to also trip valve 2A. Thus, if we desire the relay to control valve 2A to either a "normal" or "low" setting, we will in that instance omit the biasing transformer 50.

Figure 2:
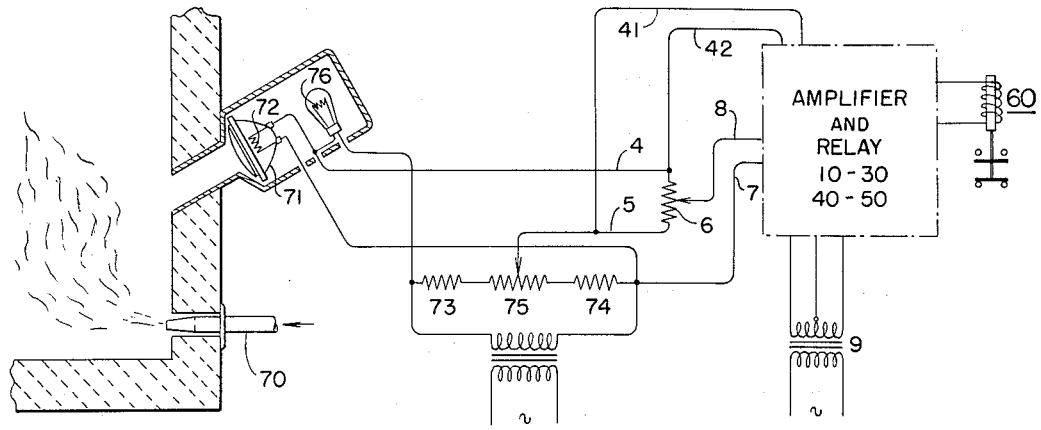
Fig. 2 is a diagrammatic disclosure of our invention arranged in a network to indicate presence of a condition.

In Fig. 2 we have shown how our invention may be applied as a flame failure detector using a bolometer pickup element. All the advantages of the Fig. 1 embodiment are utilized in this application. A furnace portion in the vicinity of burner 70 is diagrammatically illustrated in section to show how a bolometer may be made sensitive to the presence of flame from burner 70 and electromechanical relay 60 held energized during the period of flame presence.

The bolometer detection head 71 has its filament 72 included in a balanceable bridge which, in turn, includes fixed resistances 73 and 74 and a zero adjusting potentiometer 75 as well as compensating element 76, all normally balanced with no radiation impinging on the bolometer. Under this condition the output voltage of the bridge, appearing across range adjusting potentiometer 6, is zero. Amplifier and relay circuit are designed so that at zero input from the bolometer bridge the output tube 30 is not conducting and consequently the electro-mechanical relay 60 will be deenergized.

The presence of flame at burner 70 of predetermined intensity will produce sufficient radiation at the bolometer filament to cause a decrease in its resistance resulting in a proportional output voltage which is amplified by the 12AX7 tube and applied to the grids of the output tube 30. For this condition of unbalance of the bolometer bridge, the output voltage will be in phase with the anode voltage of the output tube 30. Consequently plate current will flow through this tube and its circuit including the relay 60. This current will be substantially proportional to the intensity of the flame and it may be predetermined that the relay will energize and close its contact above a minimum of radiation. If the flame fails or drops below the predetermined intensity, the signal output of the bolometer bridge will drop to a correspondingly low value and upon reaching the design value will deenergize the relay.

Here again, the novel circuit, including the output tube 30, may be seen to advantage in its function as a fail-safe feature. Any open circuit or short circuit in any of the elements of the bridge including the bolometer filament, or associated wiring, will produce a signal voltage either in phase or out of phase with the supply voltage. If the voltage is out of phase, as for example produced by a short circuit of the bolometer filament, the output tube 30 will be turned off resulting in deenergization of the relay. If the failure is of a type such as open circuit of the bolometer filament or short circuit of the compensator filament, the output signal of the bridge will be very large and in phase with the anode voltage of the output tube 30. When this output voltage reaches a predetermined maximum value and is stepped up and applied to the grid of the thyratron tube 40 by transformer 43 it is applied in such manner that when it is in phase with the plate voltage of the output tube 30, it is out of phase with the anode voltage of the thyratron tube 40 and consequently tube 40 is stopped from conducting current. After the manner described in connection with Fig. 1, this failure will cause the deenergization of the relay 60 in the same way as flame failure. As before, while normally detecting varying intensities of flame presence within the predetermined range, the circuit is designed that the output of the bridge is not sufficient to turn off thyratron tube 40.

Figure 3:
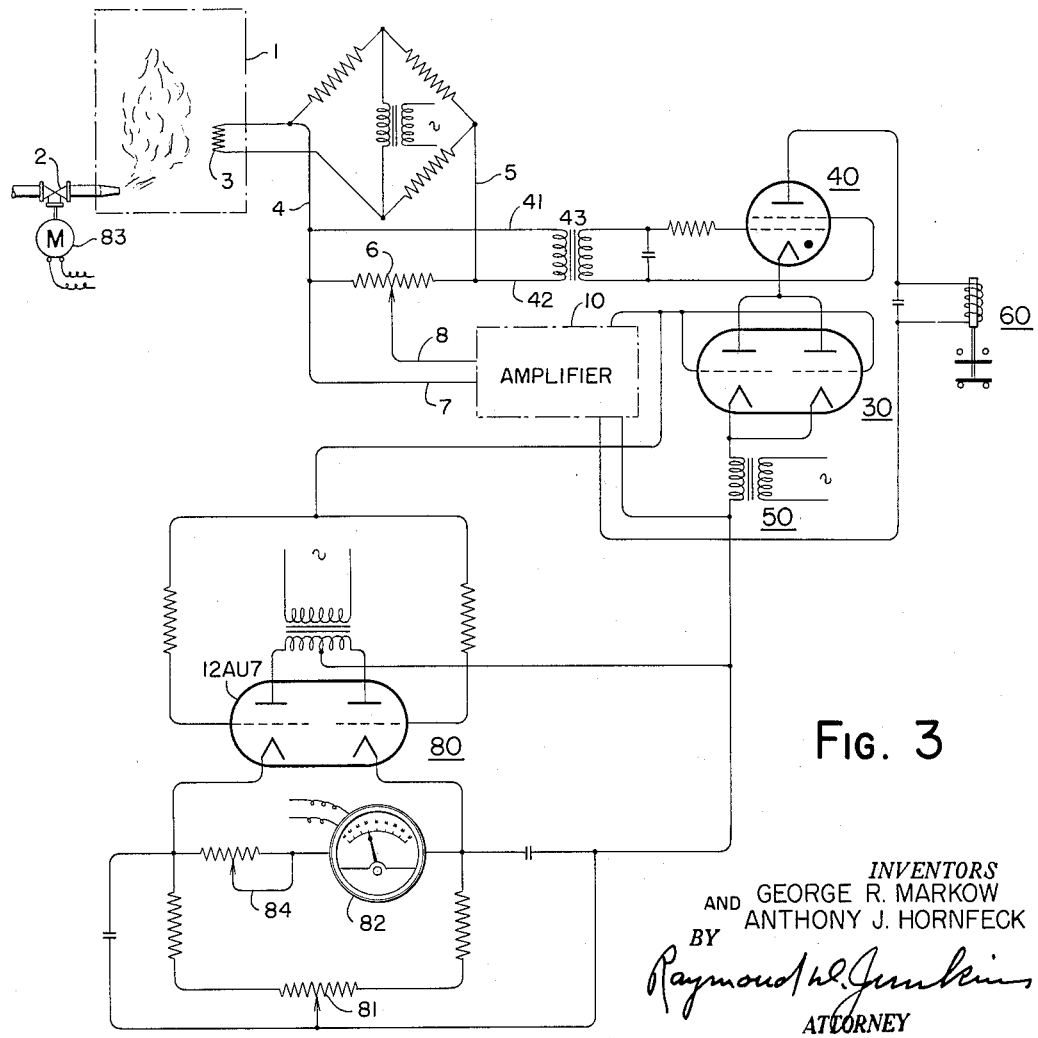
Fig. 3 shows an arrangement of our invention for obtaining an indication or record of the variable detected.

In Fig. 3 we have shown the portions of Fig. 1 needed to illustrate how and where there may be included means for indicating or recording the magnitude of the variable to which our invention is responsive. In specific embodiment we show an indicating circuit 80 including a 12AU7 tube, similar to output tube 30, and with its grids also connected together.

The input to this circuit is connected across the output of the amplifier section 10, actually in paralled with the output tube 30, one side going to the grids while the other goes to the common return line of the cathode biasing circuits which are in either section of the tube and are connected together through a balancing potentiometer 81.

For rendering a final indication or record, we show device 82 which may take the form of a zero-center direct current voltmeter placed between the two cathodes of the tube. Connected in this position, this device will indicate the magnitude of the A.-C. which is amplified by section 10. Conventional arrangements which may be made are obvious in application between device 82 and motor control valve 83 for adjustments of the fuel flow through burner 2 to control the condition in space 1 in accordance with the preselected range.

In adjustment, with zero input to the indicating circuit 80, the two sections of the tube will conduct on alternating half-cycles of its supply to establish a specific value for the zero-signal plate current. Balancing potentiometer 81 then equalizes these plate currents so that the cathodes are at the same potential and the D.-C. voltmeter between them reads zero. Therefore, the A.-C. from the amplifier, which is either in phase or 180° out of phase with either plate, will cause a potential between the cathodes of a magnitude proportional to that of the D.-C.

While potentiometer 81 balances the cathode circuits and thereby gives the "zero" adjustment of the network, a potentiometer 84 in series with indicating device 82 establishes the "range" or sensitivity.

We have disclosed and described embodiments of our invention which we regard as the more practical and flexible. It is obvious, however, that various arrangements may be made without departing from the scope of the following claims.

What we claim as new and desire to secure by Letters Patent of the United States, is:

1. An electrical system including in combination; an electric network for detection of a variable condition and establishing an A.-C. voltage in accordance therewith; an amplifier for the A.-C. voltage; and an electric circuit supplied by constant source of A.-C. and including; an electronic vacuum tube whose anode and cathode are elements of the electric circuit and which is responsive to the established voltage, a low resistance gas type of electronic tube having its anode and cathode as elements in the electric circuit and arranged to be responsive to the reverse phase of the established A.-C. voltage to effectively terminate the electric circuit when the established A.-C. voltage reaches a predetermined maximum value, means operative upon the vacuum tube anode-cathode circuit to effectively terminate the electric circuit upon the established A.-C. voltage reaching a predetermined minimum value, and exhibiting means sensitive to energy levels of the electric circuit between the minimum and maximum values of the established A.-C. voltage.

2. The combination of claim 1 including control means for the variable condition responsive to the means sensitive to energy levels of the established A.-C. voltage in the electric circuit.

3. The combination of claim 1 in which the means operative upon the vacuum tube anode-cathode circuit is arranged to impose a constant amplitude A.-C. bias on the tube which renders it completely non-conductive when the established A.-C. voltage falls to a predetermined minimum value.

4. The combination of claim 3 in which a first transformer supplies the reverse phase of the established A.-C. voltage to which the gas type of electronic tube is responsive to terminate the electric circuit.

References Cited in the file of this patent

UNITED STATES PATENTS

| | | |
|---|---|---|
| 1,989,829 | Specht | Feb. 5, 1935 |
| 2,106,287 | Swart | Jan. 25, 1938 |
| 2,457,791 | Wild | Dec. 28, 1948 |
| 2,460,455 | Hurley | Feb. 1, 1949 |
| 2,487,556 | Jenkins | Nov. 8, 1949 |
| 2,518,108 | York | Aug. 8, 1950 |
| 2,528,626 | Wannamaker | Nov. 7, 1950 |
| 2,530,642 | Yardeny | Nov. 21, 1950 |
| 2,556,556 | Schmitt | June 12, 1951 |
| 2,567,239 | Sherertz | Sept. 11, 1951 |
| 2,568,319 | Christensen | Sept. 18, 1951 |
| 2,573,041 | May | Oct. 30, 1951 |
| 2,579,001 | Jeffers | Dec. 18, 1951 |